(12) United States Patent
Ujiie et al.

(10) Patent No.: US 8,316,908 B2
(45) Date of Patent: Nov. 27, 2012

(54) METHOD AND DEVICE FOR PRELIMINARILY BONDING LAMINATED GLASS USING CURVED ROLL

(75) Inventors: Kenji Ujiie, Matsusaka (JP); Yoshiki Katada, Matsusaka (JP); Koji Tamai, Tsu (JP); Chikao Nakashima, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 12/997,042

(22) PCT Filed: Jun. 16, 2009

(86) PCT No.: PCT/JP2009/060907
§ 371 (c)(1),
(2), (4) Date: Dec. 9, 2010

(87) PCT Pub. No.: WO2010/013552
PCT Pub. Date: Feb. 4, 2010

(65) Prior Publication Data
US 2011/0100530 A1    May 5, 2011

(30) Foreign Application Priority Data

Jul. 30, 2008    (JP) ................. 2008-196474

(51) Int. Cl.
*B29C 65/00* (2006.01)

(52) U.S. Cl. .............. 156/582; 156/555; 100/155 G; 100/158 R; 100/168; 100/171; 100/176

(58) Field of Classification Search .......... 156/99, 156/102, 106, 582, 555; 100/155 G, 158 R, 100/168, 171, 176
See application file for complete search history.

(56) References Cited

U.S. PATENT DOCUMENTS
2,635,973 A * 4/1953 Swindler .............. 100/161
(Continued)

FOREIGN PATENT DOCUMENTS
JP    47-2265 A    1/1972
(Continued)

OTHER PUBLICATIONS
Derwent abstract for JP 59030737.*
(Continued)

*Primary Examiner* — Christopher Schatz
(74) *Attorney, Agent, or Firm* — Crowell & Moring LLP

(57) ABSTRACT

[Object] When press-bonding superposed curved glass plates together by a plurality of curved rolls, even if curvature of the curved glass changes, a preliminary bonding method and device of a laminated glass can cope with a variety of curvatures of the curved glass plate by an easy adjustment.

[Means to solve] The preliminary bonding device of the laminated glass has a pair of arcuately-curved rigid fixed shafts, each of which has an arc shape at a middle portion thereof and a linear shape at both ends thereof, a pair of curved rolls, each of which is formed from a covering roll member of a flexible resin layer that covers whole outermost circumferential surfaces of a plurality of short rigid cylindrical members that are provided at an outer circumference of the fixed shaft and are able to rotate through bearings, a roll driving means which drives and rotates the covering roll member of the curved roll, a curvature direction adjusting means that can adjust an angle of a direction of a curved convex portion of the arcuate fixed shaft, and a roll pressing means which sandwiches and presses the glass plates between the curved rolls. By adjusting rotation of the fixed shafts of the pair of upper and lower curved rolls by means of the curvature direction adjusting means, the preliminary bonding device can bond the glass plates of the laminated glass plate from a flat glass plate to a curved glass plate by sandwiching and pressing the glass plates.

3 Claims, 10 Drawing Sheets

U.S. PATENT DOCUMENTS 3,250,211 A * 5/1966 Artama .................. 100/170
3,905,794 A   9/1975 Revells et al.
4,701,240 A  10/1987 Kraemer et al.

FOREIGN PATENT DOCUMENTS

| JP | 51-47916 A    |   | 4/1976  |
|----|---------------|---|---------|
| JP | 59030737 A    | * | 2/1984  |
| JP | 61-169248 A   |   | 7/1986  |
| JP | 2-279544 A    |   | 11/1990 |
| JP | 3-21494 B2    |   | 3/1991  |
| JP | 2002-167242 A |   | 6/2002  |

OTHER PUBLICATIONS

Abstarct for JP 59030737.*
Full translation of JP 59030737.*
International Search Report including English translation dated Aug. 4, 2009 and PCT/ISA/237 Form (Six (6) pages).

* cited by examiner

METHOD AND DEVICE FOR PRELIMINARILY BONDING LAMINATED GLASS USING CURVED ROLL

TECHNICAL FIELD

The present invention relates to a preliminary bonding method and device of a laminated glass, which is capable of coping with a change in curvature of a glass plate and expelling air bubbles between the glass plates by only changing angles of curved rolls that press-bond the glass plates without removing and replacing the curved rolls, in a manufacturing process of the laminated glass used as a window glass of a vehicle.

BACKGROUND ART

It is known to form laminated glasses by bonding a plurality of superposed glass plates through an interlayer, which is completed by inserting a resin sheet made of PVB (polyvinyl butyral) as the interlayer between the glass plates and arranging them in layers then heating and pressing these interlayer and glass plates.

In a process in which the glass plates are bonded, if air bubbles remain between the glass plates, even if the air bubbles are minute, not only light transmittance is deteriorated, but this brings about a decrease in adhesive strength of the bonded glass plates, and then there arises a problem such as exfoliation. Therefore, it is essential that before a main bonding process in which the glass plates are bonded together by melting an adhesive film by the application of heat under a constant pressurization condition in an autoclave, a preliminary bonding process that sufficiently carries out deaeration or degassing of the air bubbles between the glass plates through heating and pressurization should take place.

In particular, since the window glass of the vehicle has a three-dimensional shape that curves in two directions, in order to degas the air bubbles between the superposed two glass plates, uniformly pressing the glass plates from both surfaces is required.

For example, Japanese Patent Provisional Publication Tokkaisho No. JP61-169248 discloses a device for joining at least one sheet of glass and at least one film of plastic material by calendering. The device has a series of pressure rollers mounted side-by-side in a flexible manner and a series of counterpressure rollers mounted in a flexible manner and cooperating with the pressure rollers. The pressure rollers and the counterpressure rollers are each mounted at the extremity of a piston rod. The other extremity of the piston rod bears a pressure piston actuated by pneumatic pressure and moving in a pneumatic casing (Patent Document 1).

Further, Japanese Patent Provisional Publication Tokkaihei No. JP2-279544 discloses a preliminary bonding device that performs the preliminary bonding by passing a laminated member for a laminated glass between a plurality of pressurizing rolls which are arranged at upper and lower sides. The preliminary bonding device has a mechanism by which all of the pressurizing rolls can rotate in a surface substantially perpendicular to a passing direction of the laminated member of the laminated glass (Patent Document 2).

Furthermore, in Japanese Patent Provisional Publication Tokkosho No. JP47-2265, for the purpose of rolling out a spherically curved glass plate, which has a synthetic resin film of intermediate insertion, to a pre-complex, a rolling device has a revolution frame that is capable of turning around an axis substantially perpendicular to a rolling direction, and a number of pressure rolls that act on upper and lower glass plates by their respective springs are arranged in the revolution frame. The rolling device allows each pressure roll to be fixed to the revolution frame together with a structure part which supports the pressure roll and is secured to the revolution frame and together with the spring independently of the other pressure rolls. Also each pressure roll is combined with a pressure roll unit that can detach from the revolution frame independently. In addition, the pressure roll unit is secured to the revolution frame so as to be adjusted laterally in the rolling direction for coping with a different curvature of the pre-complex (Patent Document 3).

Moreover, Japanese Patent Provisional Publication Tokkohei No. JP3-21494 discloses a curved roll apparatus that has a pair of flexible rolls and a plurality of backup rolls that limit a relative position of each part of the flexible roll. At least a curved portion of each flexible roll is hollow inside, and the flexible roll has therein a spiral member (Patent Document 4).

CITATION LIST

Patent Document 1: Japanese Patent Provisional Publication Tokkaisho No. JP61-169248
Patent Document 2: Japanese Patent Provisional Publication Tokkaihei No. JP2-279544
Patent Document 3: Japanese Patent Provisional Publication Tokkosho No. JP47-2265
Patent Document 4: Japanese Patent Provisional Publication Tokkohei No. JP3-21494

SUMMARY OF THE INVENTION

Technical Problem

In the Patent Document 1, the series of pressure rollers and the series of counterpressure rollers are arranged so as to press the glass sheet and the film with a direction of the normal to a curved glass surface being a pressing axis. However, both pressing axes of the upper side pressure roller and the lower side counterpressure roller are not aligned with each other and these positions of the pressing axes are quite different from each other around edges. Therefore, in a case of a curved glass having a small curvature at both edge sides which is required to be curved deeply, since the upper side pressure rollers and the lower side counterpressure rollers, which press the both edge sides of the curved glass, are arranged in a staggered configuration, uniform pressing force cannot be obtained at the glass surfaces around both edge sides. As a result, the degassing of the air bubbles between the glass plates are inadequate and the air bubbles tend to remain between the glass plates, and then there is a problem that an adhesive portion is prone to exfoliate.

In the invention described in the Patent Document 2, the plurality of pair of pressurizing rolls arranged in a row are driven and rotate independently, and by passing the laminated member of the laminated glass between the pressurizing rolls from one end of the laminated member, the degassing is performed so that an inside air between the glass plates is extracted or squeezed. However, in a case where an edge portion in a width direction of the glass plate passing between the upper and lower side pressurizing rolls comes to a gap position of the plurality of the pressurizing rolls arranged in the width direction in a row, the pressure of the edge portion is not sufficient, then insufficient degassing might arise.

Further, in the invention described in the Patent Document 3, if a stroke of each of the pressure rolls provided at upper and lower sides is broadened for coping with a variety of curvatures of the curved glass plate, because the pressure roll is forced by only elastic force of the spring, the rolling device has no other choice but to use a strong spring. The pressing force varies according to degree of expansion/contraction with variation of a curved shape of the glass. Thus the upper and lower pressure rolls do not smoothly move, and the following of the pressure roll to the curved shape of the curved glass becomes worse. For this reason, excessive force is applied to the glass plate, and this causes a problem that the glass plate is easily broken.

Furthermore, in the invention described in the Patent Document 4, the pair of rubber hollow rolls are curved into a curved shape by a plurality of holding rolls, and by connecting an end portion of the rubber roll to a driving motor then driving the rubber roll, the glass plates (having therebetween a film) pass between these rubber rolls from one end of the glass plates, and an inside air between the glass plates is extracted or squeezed. However, since the degree of curvature of the flexible rubber hollow roll depends on the relative position of the holding rolls that are set externally, it takes a long time to adjust the curvature, and there is a problem about reproducibility of the curved shape. In addition, since the holding rolls exist in part, according to the presence or absence of the holding roll, a pressure applied to the glass plate is partly different, and this brings about a problem that an entire surface of the glass cannot be uniformly degassed.

Solution to Problem

The present invention is the one that solves the above problems, and its object is to provide a preliminary bonding method and device of a laminated glass which, when pressing and bonding a plurality of superposed glass plates having therebetween an interlayer such as PVB (polyvinyl butyral) from both surfaces of the laminated glass by curved rolls, can cope with a variety of curvatures of the curved glass plate by only changing angles of the curved rolls even if the curvature of the curved glass changes, leaving no air bubbles between the glass plates and causing no breakage of the glass plate due to the pressing by pressing the both surfaces of the laminated glass with a uniform pressure.

That is, in the present invention, a preliminary bonding device of a laminated glass, which bonds superposed glass plates together through an interlayer that is sandwiched between the glass plates by sandwiching and pressing the glass plates from both outside surfaces of the superposed glass plates, comprises: a pair of upper and lower arcuately-curved rigid fixed shafts, each of which has an arc shape at a middle portion thereof and a linear shape at both ends thereof; a pair of curved rolls, each of which is formed from a covering roll member of a flexible resin layer that covers whole outermost circumferential surfaces of a plurality of short rigid cylindrical members that are provided at an outer circumference of the fixed shaft and are able to rotate through bearings; a roll driving means which drives and rotates the covering roll member of the curved roll; a curved portion inclination angle adjusting means which changes a curved rounded shape of a gap portion between the pair of upper and lower curved rolls, viewed from an incoming direction of the glass plates between the curved rolls, by rotating the fixed shafts of the pair of upper and lower curved rolls and adjusting an inclination angle of the curved middle portion of the fixed shaft; and a roll pressing means which sandwiches and presses the glass plates between the curved rolls.

Or, in the present invention, the preliminary bonding device of the laminated glass further comprises: a roll gap adjusting means which adjusts the gap between the pair of upper and lower curved rolls in accordance with a thickness of the glass plates by moving both ends of the upper curved roll together in an upper or a lower direction.

Or, in the present invention, the preliminary bonding device of the laminated glass further comprises: a turning means which turns a supporting frame that supports both end portions of the pair of upper and lower fixed shafts so that when passing the curved superposed glass plates between the pair of upper and lower curved rolls, an imaginary line connecting rotation centers of the pair of upper and lower curved rolls is a normal of a surface of the superposed glass plates sandwiched by the curved rolls at a fulcrum point of the surface of the glass plates with a midpoint of the imaginary line being the fulcrum.

Or, in the present invention, a preliminary bonding method of a laminated glass, which bonds superposed glass plates sandwiching therebetween an interlayer, using a preliminary bonding device of the laminated glass, the preliminary bonding device has a pair of upper and lower arcuately-curved rigid fixed shafts, each of which has an arc shape at a middle portion thereof and a linear shape at both ends thereof; and a pair of curved rolls, each of which is formed from a covering roll member of a flexible resin layer that covers whole outermost circumferential surfaces of a plurality of short rigid cylindrical members that are provided at an outer circumference of the fixed shaft and are able to rotate through bearings, the preliminary bonding method comprises: adjusting an inclination angle of a curved portion of the curved roll so that a curved rounded shape of a gap portion between the pair of upper and lower curved rolls, viewed from an incoming direction of the glass plates between the curved rolls, is fitted to a curved shape of the curved glass plates; and bonding the superposed glass plates by sandwiching and pressing the glass plates by the pair of curved rolls.

Or, in the present invention, the preliminary bonding device further has a turning means which turns a supporting frame that supports both end portions of the pair of upper and lower fixed shafts, and the preliminary bonding method of the laminated glass further comprises: turning the supporting frame that supports the pair of upper and lower curved rolls so that when passing the curved superposed glass plates between the pair of upper and lower curved rolls, an imaginary line connecting rotation centers of the pair of upper and lower curved rolls is identical with a normal of a surface of the superposed glass plates sandwiched by the curved rolls at a fulcrum point of the surface of the glass plates with a midpoint of the imaginary line being the fulcrum.

Or, in the present invention, the preliminary bonding method of the laminated glass further comprises: previously storing a change of an inclination angle of movement of the pair of arcuately-curved curved rolls so as to be fitted to a pre-set curved shape of the superposed curved glass plates that have a curved surface, a depth of which changes at some midpoint; and changing the inclination angle of movement of the curved rolls while following the curved surface of the superposed curved glass plates sandwiched between the pair of arcuately-curved curved rolls so that the change of the angle is substantially identical with the depth of the curved surface of the glass plates, when passing the curved superposed glass plates between the pair of upper and lower curved rolls.

Effects of Invention

When employing the preliminary bonding method and device of the laminated glass of the present invention, by pressing the plurality of superposed glass plates having therebetween the interlayer such as PVB while passing the glass plates between the pair of arc shaped curved rolls to bond the glass plates together, the glass plates can be uniformly pressed from both surfaces of the curved glass plates with uniform pressing force. Therefore, the preliminary bonding method and device can leave no air bubbles between the glass plates and can cause no breakage of the glass plate due to the pressing.

Further, in a case where the glass plate is the curved glass, even if the depth of the curved surface of the glass plate changes, by an easy adjustment which only adjusts the angle of the turning frame to which each of the pair of upper and lower curved rolls are fixed by rotating the turning frame, the preliminary bonding method and device can adjust the curvature of the gap between the pair of curved rolls so as to be identical with the curvature of the glass plate.

EMBODIMENTS FOR CARRYING OUT THE INVENTION

Figure 1:
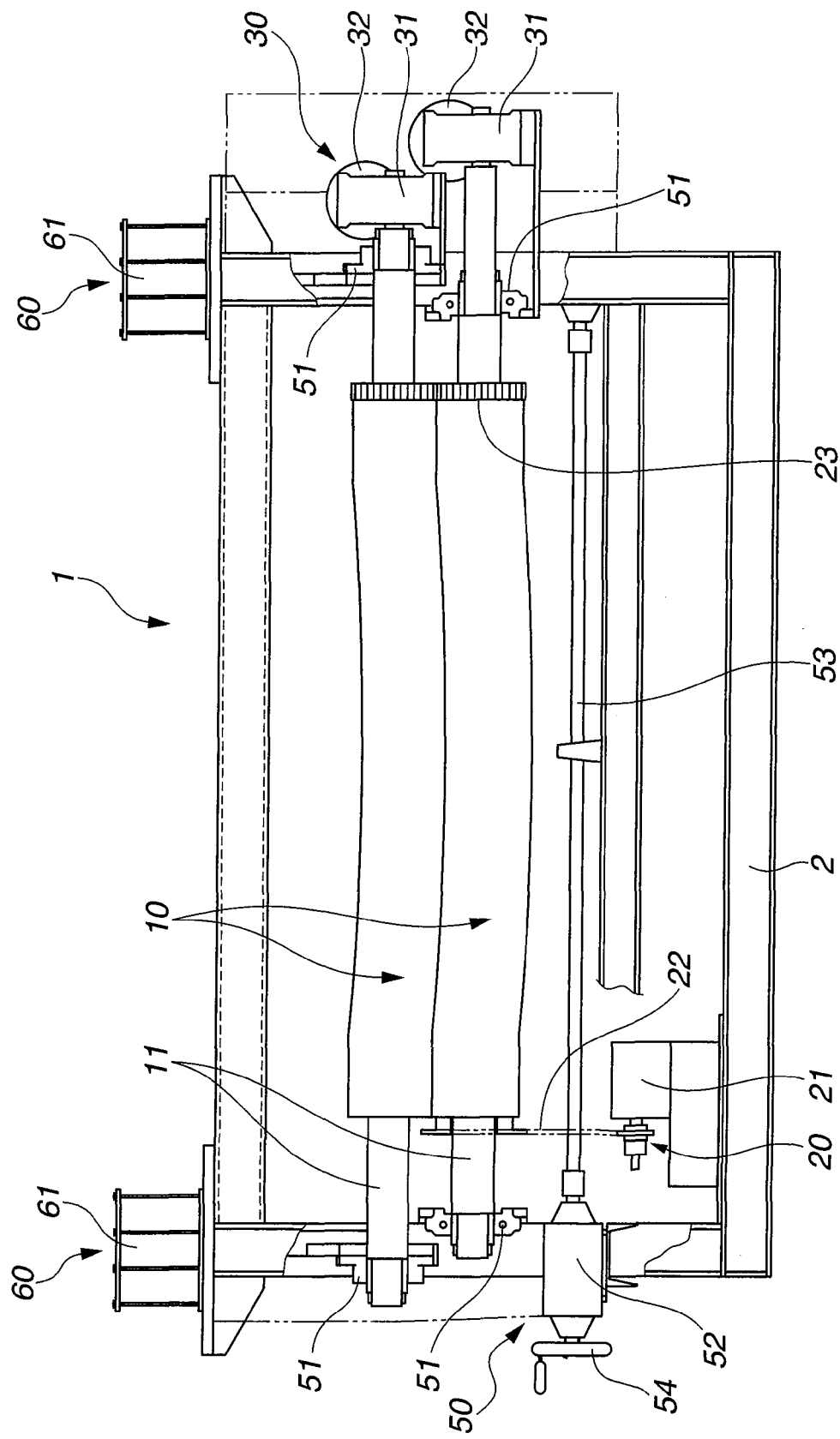
FIG. 1 is a general front view of a preliminary bonding device of the present invention.
Figure 3:
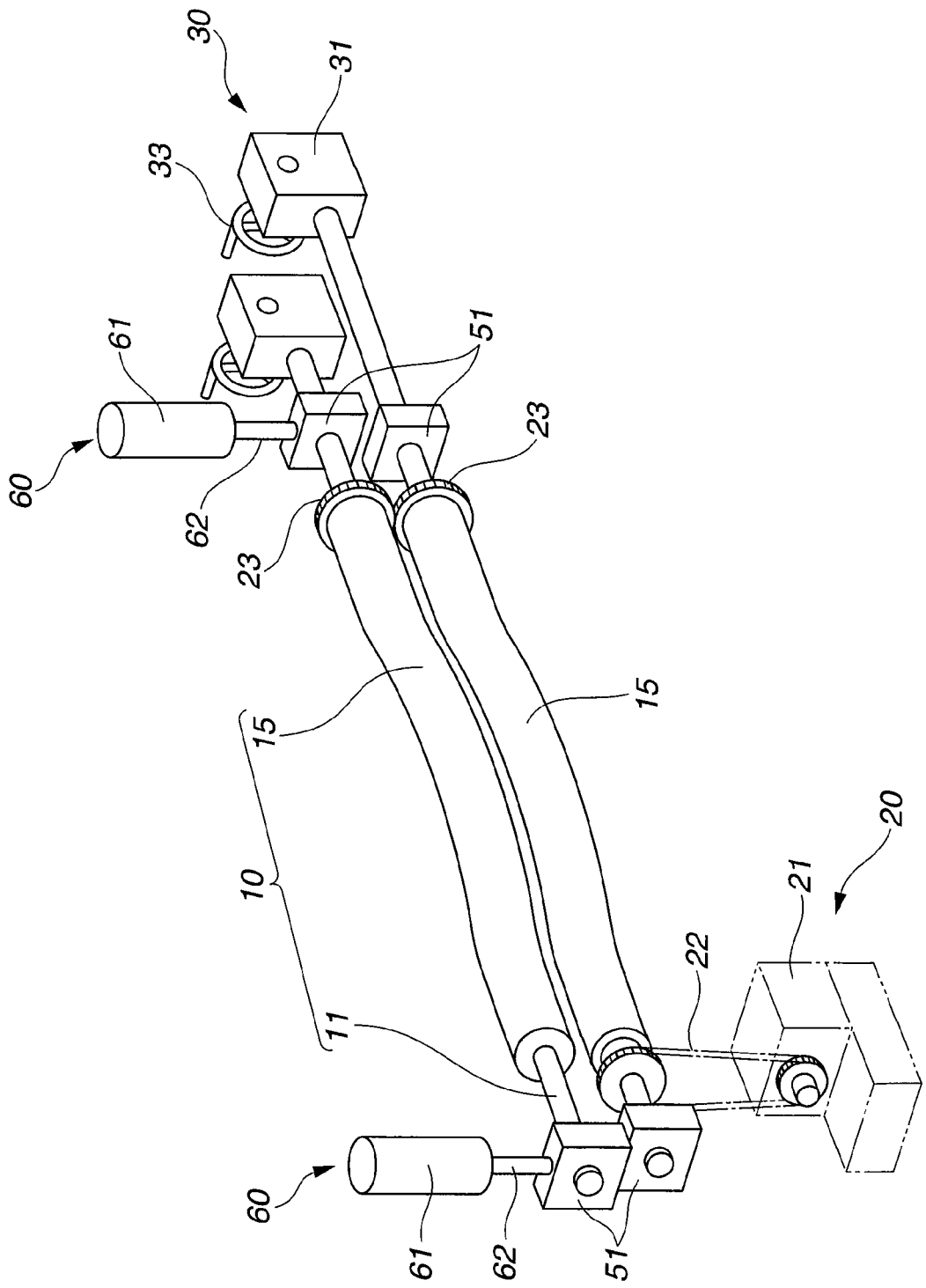
FIG. 3 is a perspective view of a curved roll of the preliminary bonding device of the present invention.
Figure 12:
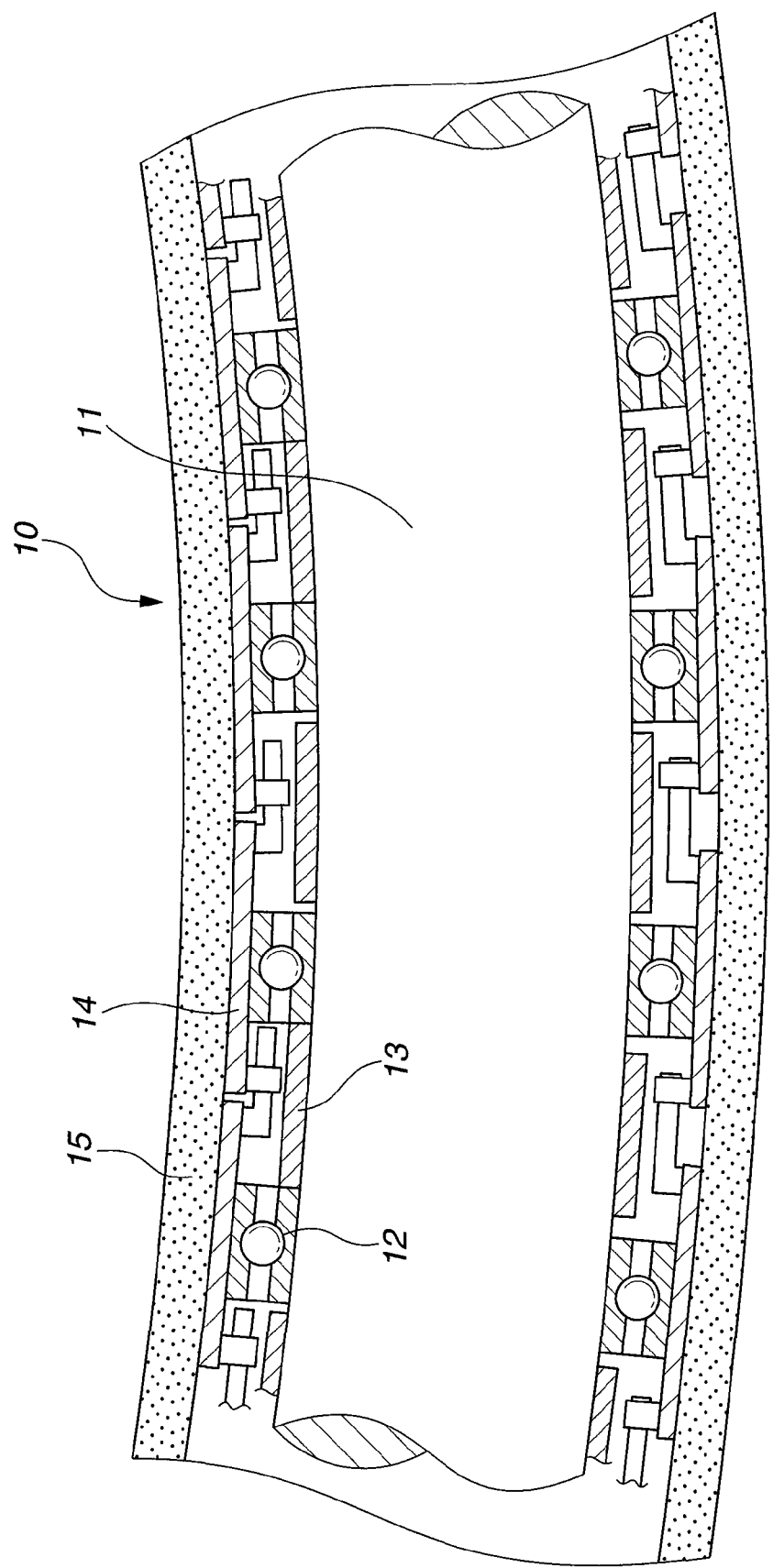
FIG. 12 is a sectional view of the curved roll.

As shown in FIGS. 1, 3 and 12, a pair of long fixed shafts 11, 11 made of rigid material, each of which has a curved arcuate shape at a middle portion and a linear shape at both ends, are prepared. A preliminary bonding device 1 of a laminated glass plate has a plurality of short rigid cylindrical members 14, 14 . . . , each of which is contiguous with an outer circumferential surface of the fixed shaft 11 and is able to rotate through bearings 12, 12 . . . , a pair of curved rolls 10, 10, each of which is formed from a lagging or covering roll member 15 of an arcuately-curved flexible resin layer that covers whole outermost circumferential surfaces of the plurality of cylindrical members 14, 14 . . . , a roll driving means 20 that drives and rotates the covering roll member 15 of the curved roll 10, a curvature direction adjusting means (a curved portion inclination angle adjusting means) 30 that can adjust an angle of a direction of a curved convex portion of the arcuate fixed shaft 11, and a roll pressing means 60 that can sandwich and press glass plates between the curved rolls 10. The preliminary bonding device 1 can bond the glass plates of the laminated glass plate from a flat glass plate to a curved glass plate by sandwiching and pressing the glass plates, by only adjusting rotation of the fixed shafts 11, 11 of the pair of upper and lower curved rolls 10, 10 by means of the curvature direction adjusting means 30.

Figure 10:
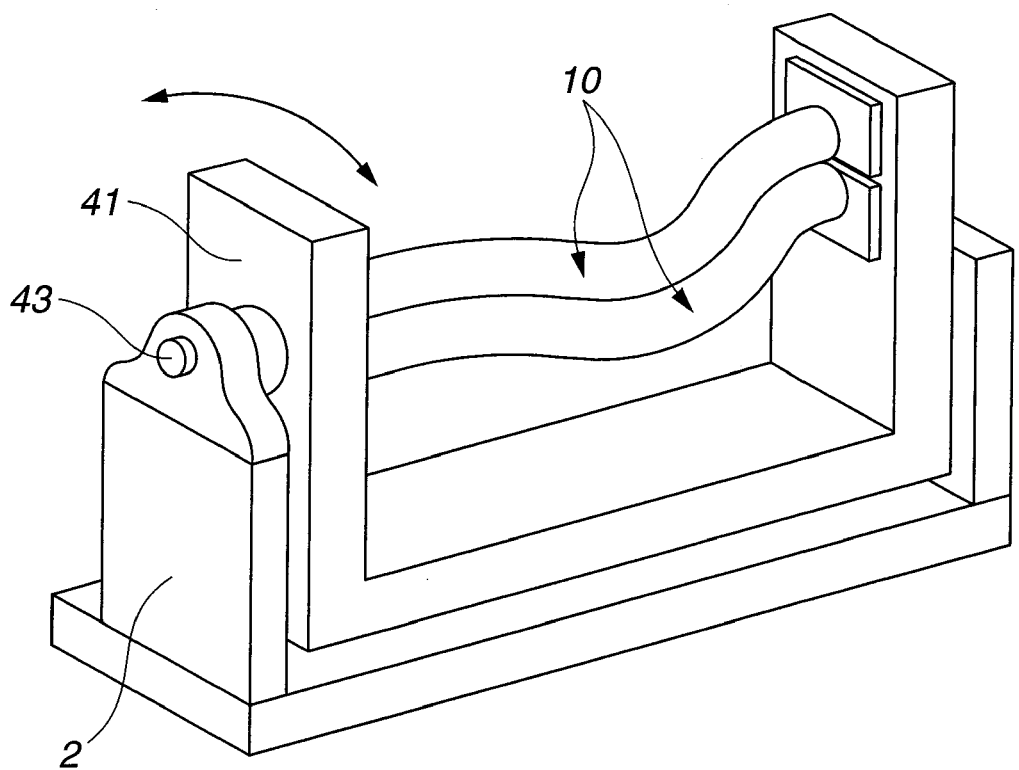
FIG. 10 is a perspective view of a turning means of the preliminary bonding device of the present invention.
Figure 11:
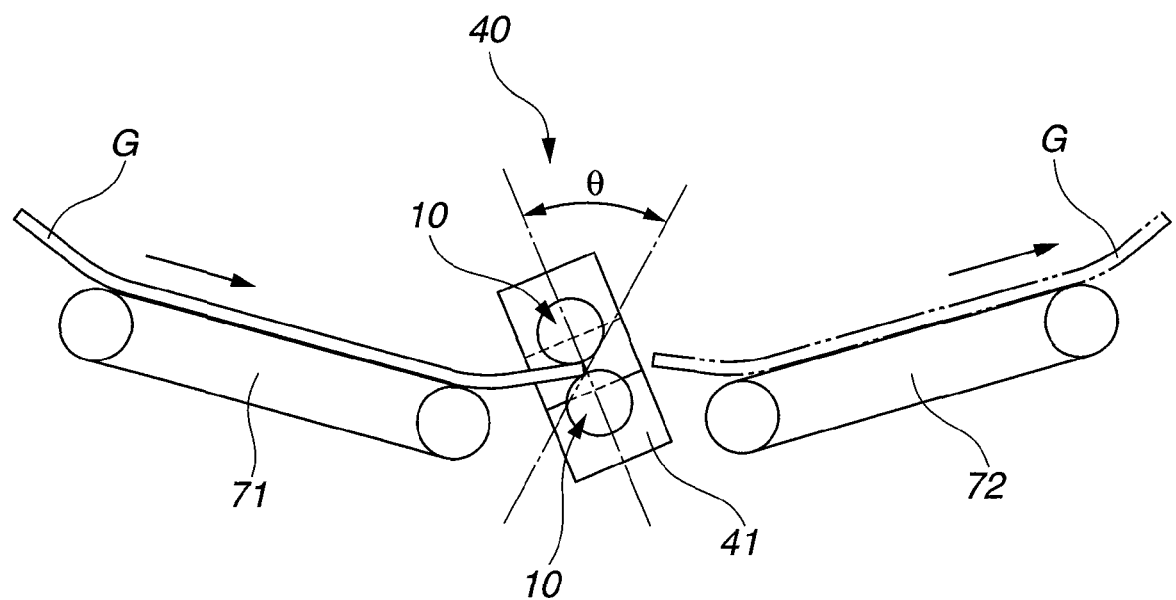
FIG. 11 is a side view of the turning means of the preliminary bonding device of the present invention.

Further, as shown in FIGS. 10 and 11, a turning means (a rotating means) 40 for turning (rotating) supporting frames (turning frames) 41, 41 that support bearings 51, 51 . . . at both end portions of the upper and lower fixed shafts 11, 11 is provided. The turning means 40 is set so that when passing a laminated curved glass plate G between the pair of upper and lower curved rolls 10, 10, an imaginary line connecting rotation centers of the pair of upper and lower curved rolls 10, 10 is a direction of the normal to a plate surface of the laminated glass G sandwiched by the curved rolls 10, 10 at a fulcrum point of the plate surface of the laminated glass G with a midpoint of the imaginary line being the fulcrum.

The curved roll 10 is formed from the long arc shaped fixed shaft 11 which is circular in cross section and is made of metal material, the plurality of short rigid cylindrical members 14, 14 . . . , each of which is contiguous with the outer circumferential surface of the fixed shaft 11 and is able to rotate through the bearings 12, 12 . . . , and the arcuately-curved covering roll member 15 that covers whole outermost circumferential surfaces of the plurality of cylindrical members 14, 14 . . . with one flexible resin layer. The covering roll member 15 as a whole is a linear shape at both ends and is an arc shape at the middle.

The resin of the covering roll member 15 is a flexible resin whose hardness is 65~80. If the hardness is less than 65, when pressing and bonding superposed glass plates of the laminated glass, the covering roll member elastically deforms and sufficient pressing force cannot be obtained. If the hardness exceeds 80, elastic force is too low and there is a risk that the glass plate may break due to the pressing of the glass. With regard to the hardness of 65~80, it is ascertained that this hardness can secure the both elastic force and pressing force of the laminated glass from an experimental result.

Further, it is desirable that the covering roll member 15 should be made of a synthetic rubber of a nitrile rubber (NBR) that has heat resistance and soil-resistance. However, it is not limited as long as the rubber is a rubber that satisfies these conditions.

Between the bearings 12 at a side of the fixed shaft 11, cylindrical spacers 13, 13 . . . are arranged and contiguous with the fixed shaft 11. Shift of a position of each bearing 12 is prevented by the cylindrical spacer 13, and the position of each bearing 12 can be maintained at predetermined intervals.

As mentioned above, although the arcuately-curved covering roll member 15 is made of the rubber having the hardness of 65~80, the rubber has such elastic force that the covering roll member 15 can rotate while a convex surface of an arc shaped portion of the covering roll member 15 is repeating elongation/contraction at each rotation of the covering roll member 15 simultaneously with the rotation of the bearings 12 with the curved fixed shaft 11 being a rotation axis.

Both ends of the arcuately-curved fixed shaft 11 are fixed so as to be able to vary an angle (an inclination angle) of an arcuate shaped portion (a curved convex surface portion) of the fixed shaft 11 by the after-mentioned curvature direction adjusting means 30. Although the pair of upper and lower fixed shafts 11, 11 are arranged parallel to each other so that their respective arc shaped convex surface sides become the same direction, the fixed shaft 11 has such overall length as to sandwich and pass a curved window glass for the vehicle and a building flat window glass between the fixed shafts 11.

As shown in FIGS. 1 and 3, the roll driving means 20 can rotate the covering roll member 15 by rotating a pulley that is provided at one end side of the covering roll member 15 of the curved roll 10 through a driving chain 22 by means of a driving motor 21 provided at a lower position of one end of the lower side curved roll 10 whose vertical height position is fixed.

Further, a gear 23 provided at the other end side of the covering roll member 15 of the height-fixed curved roll 10 and a gear 23 provided at an end side of the covering roll member 15 of the upper side curved roll 10 whose height is variable mesh with each other, and therefore the covering roll member 15 of the height position-variable curved roll 10 can also rotate in synchronization with the height-fixed curved roll 10.

With respect to the gears 23, 23 provided at the ends of the pair of covering roll members 15, 15, since both gears 23, 23 are close to or separate from each other according to a thickness of the glass plate passing between the curved rolls 10, a gear having high or long teeth is employed to cope with the change of the thickness of the glass plate.

The gears 23, 23 can cope adequately with the range of the thickness of the glass plate which depends on difference of the vehicle model.

As shown in FIG. 3, the curvature direction adjusting means 30 can rotate the fixed shaft 11 so as to obtain a predetermined angle in a range of ±90 degrees with a shaft center of the arc shaped fixed shaft 11 being a rotation center, thereby adjusting a position of the arc shaped convex surface of the middle portion of the fixed shaft 11 from a direction directly above the preliminary bonding device to a direction directly below the preliminary bonding device. With this mechanism, by only rotating the fixed shaft 11 a half turn, the preliminary bonding device can cope with a variety of curvatures of the curved glass plate.

FIG. 3 shows the curvature direction adjusting means 30 that changes the rotation direction of the arc shaped convex surface in a direction in which the fixed shaft 11 can rotate while decelerating through a decelerator 31 by manually rotating a handle 33. However, instead of the handle 33, if a motor is provided, adjustment of a setting angle can be automatically made with the touch of a key.

Figure 4A:
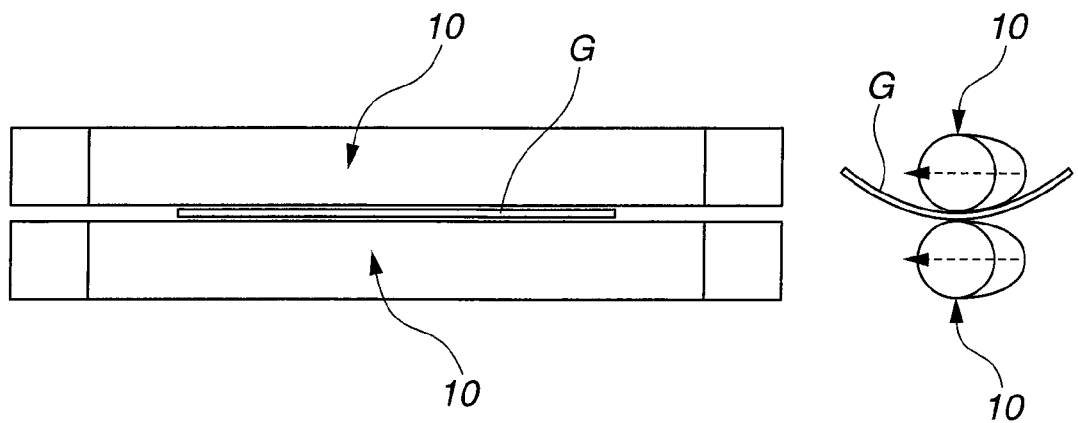
FIG. 4A is a drawing for explaining a curvature direction adjusting means of the curved roll of the present invention.

Further, by the curvature direction adjusting means 30, for example, when setting each of the pair of fixed shafts 11, 11 to an angle of a horizontal direction as shown in FIG. 4A, a gap between the curved rolls 10, 10 can be linear which is viewed from the horizontal direction. This angle is set when the flat glass plate G is sandwiched and pressed between the curved rolls 10, 10.

Figure 4B:
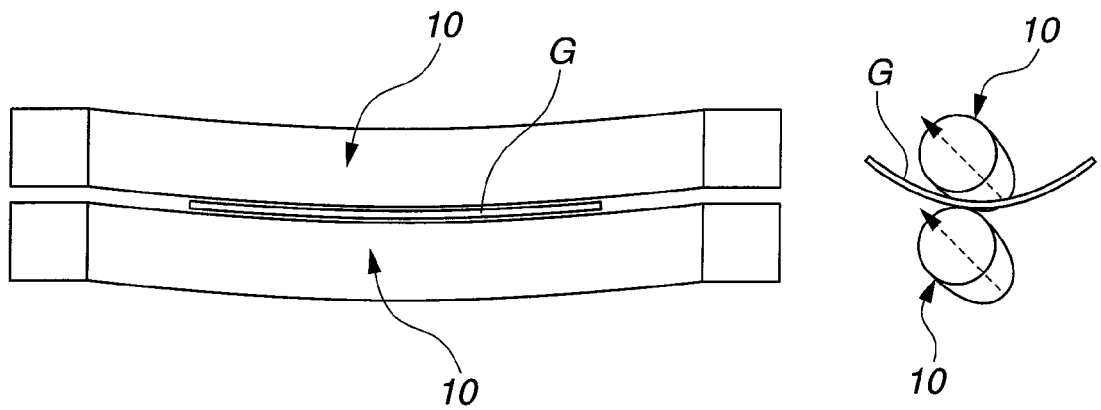
FIG. 4B is a drawing for explaining the curvature direction adjusting means of the curved roll of the present invention.

On the other hand, by the curvature direction adjusting means 30, for example, when setting each inclination angle of the convex surface portion of the curved portion of the pair of fixed shafts 11, 11 to a 45-degree angle which inclines in a lower direction as shown in FIG. 4B, the gap between the curved rolls 10, 10, viewed from the horizontal direction of an incoming side of the glass plate G, can be a gentle rounded arc shape having a large curvature.

Figure 4C:
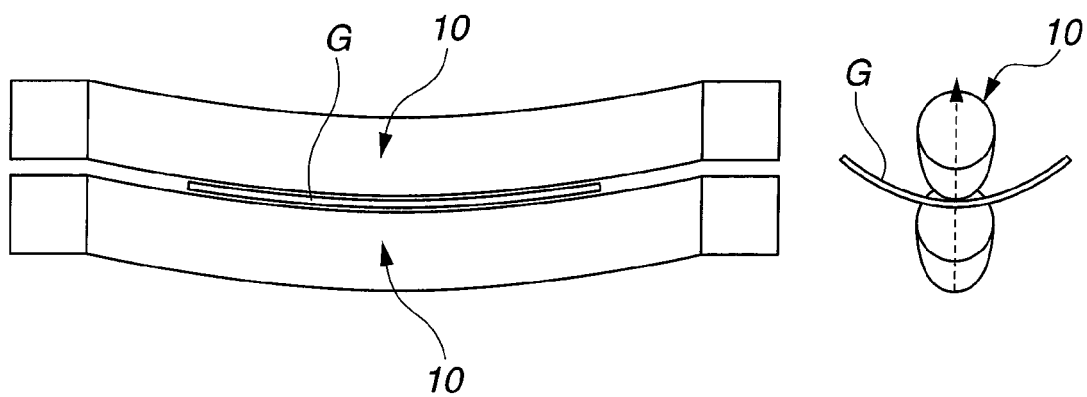
FIG. 4C is a drawing for explaining the curvature direction adjusting means of the curved roll of the present invention.

Furthermore, by the curvature direction adjusting means 30, for example, when setting each inclination angle of the convex surface portion of the curved portion of the pair of fixed shafts 11, 11 to a 90-degree angle which inclines in a direction directly below the preliminary bonding device as shown in FIG. 4C, the gap between the curved rolls 10, 10, viewed from the horizontal direction, can be an arc shape having a small curvature which is identical with the curvature of the fixed shafts 11, 11.

In this manner, by means of the curvature direction adjusting means 30, by only slightly rotating the arc shaped fixed shafts 11, 11, the curvature of the gap between the pair of curved rolls 10, 10 can be adjusted to a variety of curvatures of the arc shape within a range from the linear shape to the curvature of the curved roll 10 of the fixed shaft 11.

A roll gap adjusting means 50 can move the upper side curved roll 10 up or down. By manually or automatically moving the upper side curved roll 10 according to the change of the thickness of the glass plate sandwiched and pressed between the curved rolls 10, 10, the roll gap adjusting means 50 adjusts a minimum gap between the pair of upper and lower side curved rolls 10, 10. On the other hand, as for the lower side fixed shaft 11, its both ends are supported through the bearings 51, 51, and the height of the lower side fixed shaft 11 is fixed.

Figure 2A:
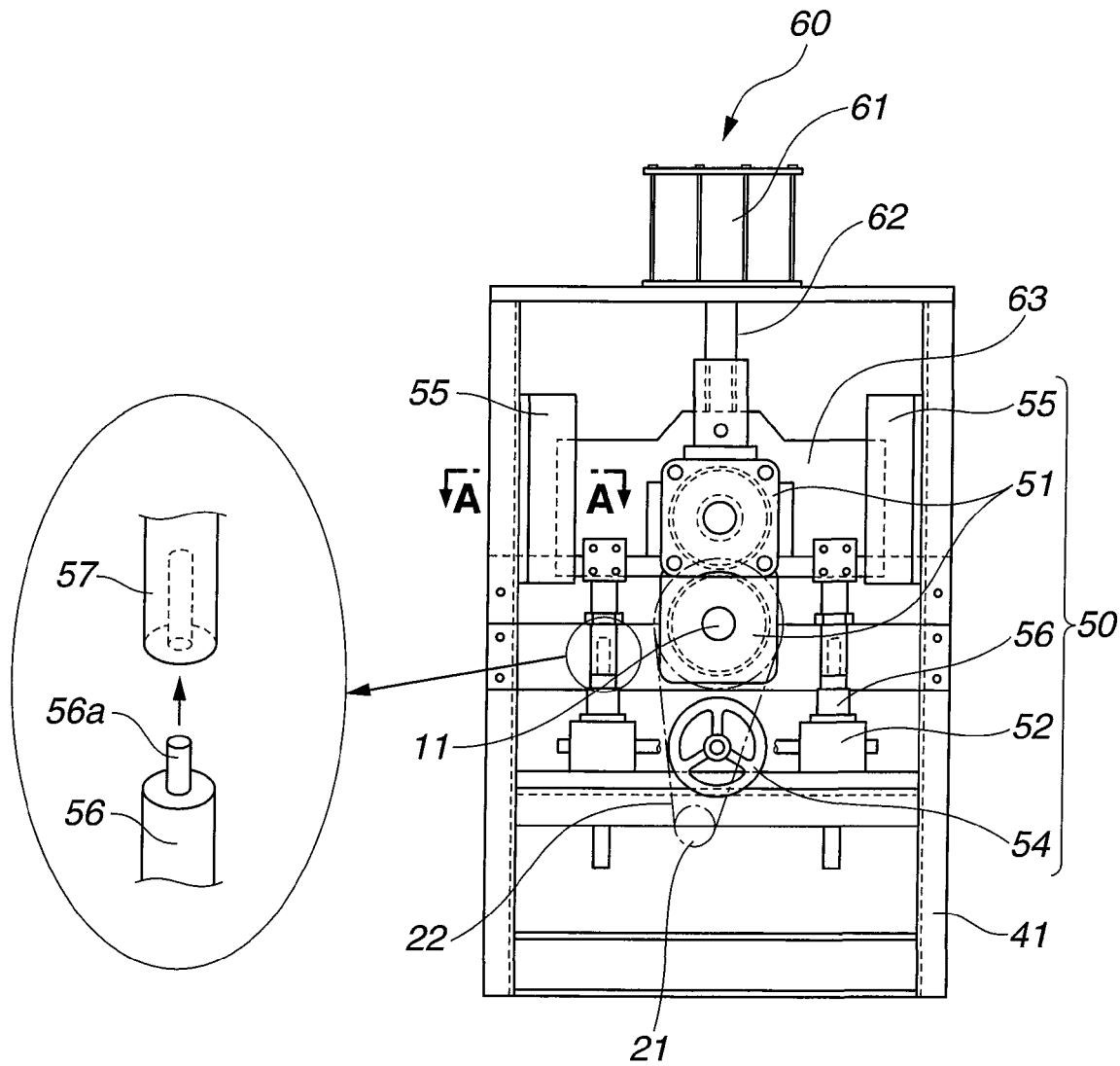
FIG. 2A is a general side view of the preliminary bonding device of the present invention.
Figure 2B:
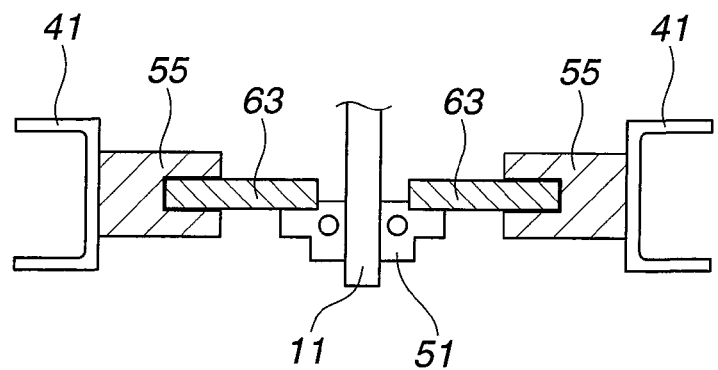
FIG. 2B is a general side view of the preliminary bonding device of the present invention.

As shown in FIG. 2, the roll gap adjusting means 50 rotates a handle 54 (or a motor) then rotates a connecting rod 53 directly connecting with a shaft of the handle (or the motor) and a horizontal rod 55 orthogonal to the connecting rod 53 around both ends of the connecting rod 53, thereby moving up-and-down rods 56, 56 in upper and lower directions through gears 52, 52 that are provided at both ends of the horizontal rod 55. A protruding part 56a that is a top end of the up-and-down rod 56 is loosely fitted into a cylindrical member 57 that is fixed to a lower end portion of a press plate 63, and the up-and-down rod 56 is slidably provided.

With regard to the roll pressing means 60, as shown in FIG. 2, a top end portion of each cylinder rod 62 of press cylinders 61, 61 is fixed to the press plate 63. A side end portion of the press plate 63 is supported slidably in upper and lower directions by guides 55, 55 (see A-A sectional view) which have a square-bracket-shaped cross section. The bearings 51, 51 of the fixed shaft 11 of the upper side curved roll 10 are fixed to the press plate 63, then the upper side curved roll 10 is supported.

Next, the turning means 40 as shown in FIGS. 10 and 11 is used when bonding the glass plates by sandwiching and pressing the glass plates of the laminated glass plate from both surfaces of the laminated glass in a preliminary bonding process of the laminated glass such as relatively large-sized front and rear window glasses of the vehicle and a glass having a deep curved surface that is curved deeply.

In order that a pressing direction to the glass plate by the pair of curved rolls 10, 10 becomes a direction of the normal to the plate surface of the curved glass G sandwiched by the curved rolls 10, 10 at a sandwiched portion, the turning means 40 turns the turning frames 41, 41 supporting the curved rolls 10, 10 with the passing of the curved glass between the curved rolls 10, 10. A pressing axis connecting centers of the pair of upper and lower side curved rolls 10, 10 is therefore set to the normal direction of the curved surface at a pressed portion of the curved glass plate.

The lower side fixed shaft 11 of the pair of upper and lower side curved rolls 10, 10 is supported through the bearings at its both ends. The fixed shaft 11 of the upper side curved roll 10 is supported adjustably in upper and lower directions through the roll gap adjusting means 50.

These bearings for supporting the pair of upper and lower side curved rolls 10, 10 and roll gap adjusting means 50 etc. are secured to vertical and horizontal frames, and both ends of lower horizontal frames 32, 32 is fixed to the vertical frames 41, 41, then the turning frame 41 is formed.

Further, as shown in FIGS. 10 and 11, the turning frame 41 rotates within a range of an angle θ through a motor (not shown) and a transmission (or a speed changer) (not shown)

so that the gap portion between the pair of upper and lower side curved rolls 10, 10 is a rotation center.

As can be seen in FIG. 11, when a top end curved portion of the curved glass plate G is inserted between the curved rolls 10, 10 by a carrying-in conveyor 71, a top end of the turning frame 41 tilts or inclines to a carrying-in conveyor 71 side. When a middle portion of the glass plate G is sandwiched and pressed between the curved rolls 10, 10, the turning frame 41 is in a standing state in a vertical direction. When a rear end curved portion of the curved glass plate G comes between the curved rolls 10, 10 by a carrying-out conveyor 72, the top end of the turning frame 41 tilts or inclines to a carrying-out conveyor 72 side.

That is to say, the turning frame 41 turns or rotates at the angle θ with the movement of the curved glass plate G from the top end curved portion to the rear end curved portion between the curved rolls 10, 10.

As shown in FIG. 11, as a carrying-in carrying-out means 70, the carrying-in conveyor 71 that allows adjustment of an insertion angle of the glass plate from a horizontal direction to a lower direction, also the carrying-out conveyor 72 that allows adjustment of the inclination angle of the conveyor, are provided in rear and front positions of the turning frame 41 which supports the curved rolls 10, 10, the roll pressing means 60 and the turning means 40 etc. and is able to turn or rotate. The carrying-in carrying-out means 70 adjusts each inclination angle of the conveyors so that the incoming top end curved portion of the curved glass plate G and the outgoing rear end curved portion of the curved glass plate G come to a gap position between the pair of upper and lower side curved rolls 10, 10.

Inclination angles of the carrying-in conveyor 71 and the carrying-out conveyor 72 are not necessarily the same depending on the shape of the curved laminated glass G. In this case, inclination angles of the carrying-in side and the carrying-out side can be each adjusted to a desired angle.

Next, working of the preliminary bonding device of the present invention will be explained.

The reason why the shape of the curved roll 10 is the arcuately-curved shape, i.e. the middle of the curved roll 10 is the arc shape and the both ends are the linear shape is because, by means of the curvature direction adjusting means 30, a shape of the gap between the pair of upper and lower side curved rolls 10, 10, viewed from the carrying-in side of the glass plate G, can be changed from the linear shape in the horizontal direction to the rounded convex or arcuate shape that curves upwards or to the rounded convex or arcuate shape that curves downwards, by only rotating the fixed shaft 11 in the range of ±90 degrees with a linear portion of the arc shaped fixed shaft 11 being a shaft center, namely that by only slightly rotating the arc shaped fixed shafts 11, 11, the curvature of the gap between the curved rolls 10, 10 can be adjusted to a variety of curvatures of the arc shape within the range of the curvature of the curved roll 10 of the fixed shaft 11.

Figure 7:
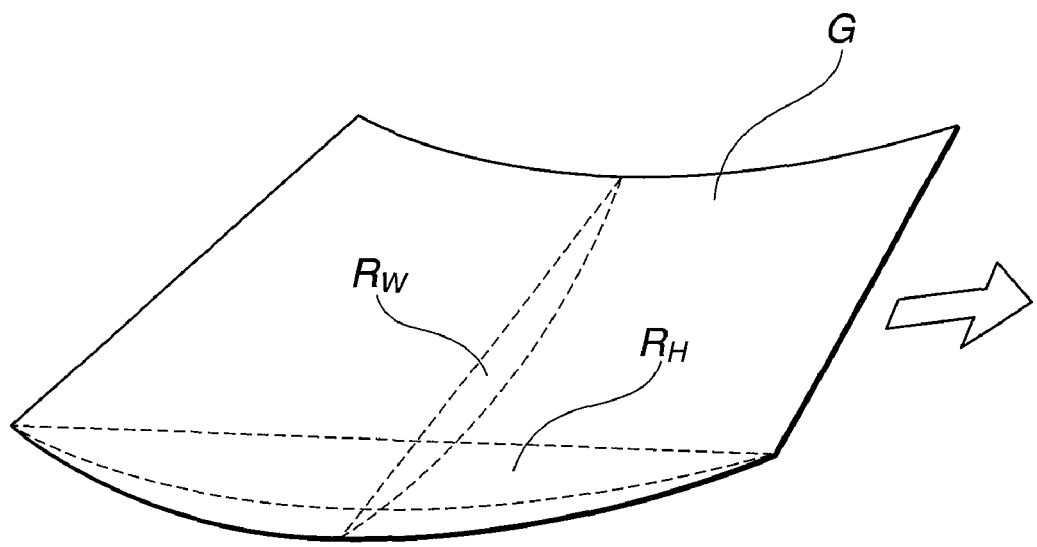
FIG. 7 is a front window glass for a vehicle, used in an embodiment 3 of the present invention.

In a case of the press-bonding of the laminated glass plate such as a glass having a curved rounded shape in two directions as shown by reference signs $R_W$ and $R_H$ in FIG. 7 (especially a large-sized curved glass of the front and rear window glasses of the vehicle or a glass having curved portions of small curvature around its both sides), in order that the normal direction of the curved laminated glass G passing between the pair of upper and lower side curved rolls 10, 10 at a contact surface of the laminated glass G with the curved rolls is identical with or equalized with the pressing axis by the pair of curved rolls 10, 10, the inclination angles of the carrying-in conveyor and the carrying-out conveyor of the carrying-in carrying-out means 70 shown in FIG. 11 are adjusted, and also the curved rolls 10, 10 are rotated within the range of the angle θ together with the turning frame 41 supporting the curved rolls 10, 10. Then the pressing force applied to the curved laminated glass plate becomes uniform and excessive force is not applied to the glass plate.

Although the height position of the lower side curved roll 10 of the pair of upper and lower side curved rolls 10, 10 is fixed, the upper side curved roll 10 provides the pressing force toward the lower side curved roll 10 by the press cylinders 61, 61 of the roll pressing means 60. On the other hand, in order for the gap between the curved rolls 10 not to become too narrow, or in order that the gap between the curved rolls 10 is prevented from being less than a setting value, limitation of downward movement, such as a function of a stopper, for the curved roll 10 is provided by the contact or linkage between the up-and-down rod 56 of the roll gap adjusting means 50 and the cylindrical member 57 of the press plate 63.

With respect to the gap between the curved rolls 10 set by the roll gap adjusting means 50, it is set to be narrower than a thickness of the glass plate G when passing between the curved rolls 10. Therefore, normally, an interlayer sandwiched between the glass plates is pressed by the pair of upper and lower side curved rolls 10, 10, the glass plates are then bonded together.

Further, in a case where a total thickness of the glass plates is thicker than the gap, the synthetic rubber-made covering roll members 15, 15 of the pair of upper and lower side curved rolls 10, 10 are compressed by the elastic deformation. Furthermore, the gap is still narrow in comparison with the total thickness of the glass plates, it is required to slightly raise the upper side curved roll 10 for widening the gap, the press plates 63, 63 are therefore moved upwards along the guides 55, 55 against the pressing force of the press cylinders 61, 61.

Next, examples of the use of the preliminary bonding device of the present invention will be explained.

EXAMPLE 1

An example 1 is a case where relatively small-sized curved glass plates having a shallow curvature, only one direction of which is curved, a direction of which orthogonal to the one direction is linear, among the curved shaped laminated glasses, are preliminarily bonded together.

Each of the curved convex surface portions of the fixed shafts 11, 11 is previously set to the angle of the horizontal direction as shown in the right hand side drawing in FIG. 4A by rotating each of the fixed shafts 11, 11 of the pair of arcuate curved rolls 10, 10 with the handle 33 or the motor through the decelerator 31. The gap between the curved rolls 10, 10, viewed from the horizontal direction, becomes the linear shape as shown in the left hand side drawing in FIG. 4A. The line connecting the axes of the pair of upper and lower side curved rolls 10, 10 is set to the vertical direction.

Further, the carrying-in conveyor 71 and the carrying-out conveyor 72 of the carrying-in carrying-out means 70 are set to their respective inclined states which are fitted to the degree of the curvature of the glass plate, in order that a bottom surface of the glass plate is supported on top surfaces of the carrying-in and carrying-out conveyors at the rear and front sides of the gap position and the excessive force is not applied to the carried-in/out glass plates when the curved glass plates pass between the gap of the pair of curved rolls 10, 10.

Here, as the interlayer, at least one of normally-used polyvinyl butyral (PVB) film whose thickness is approximately 0.7~1 mm is used. The glass plates sandwiching therebetween this interlayer are heated up to a predetermined temperature, then the bonding is carried out with the air bubbles between the glass plates removed or expelled or degassed while sandwiching the glass plates between the pair of pressing rolls (curved rolls).

EXAMPLE 2

Figure 5:
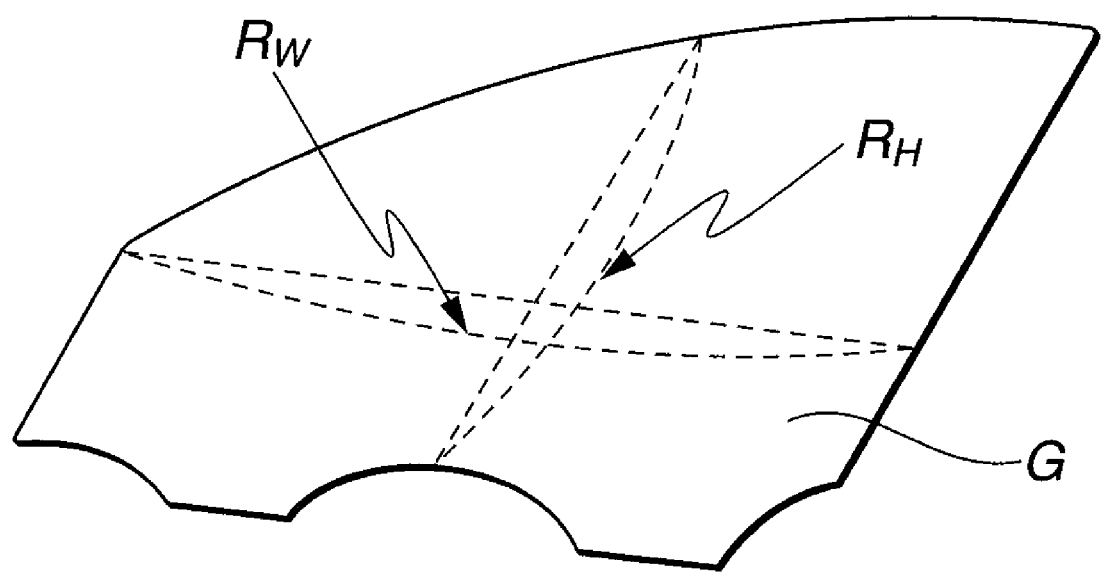
FIG. 5 is a side window glass for a vehicle, used in an embodiment 2 of the present invention.
Figure 6:
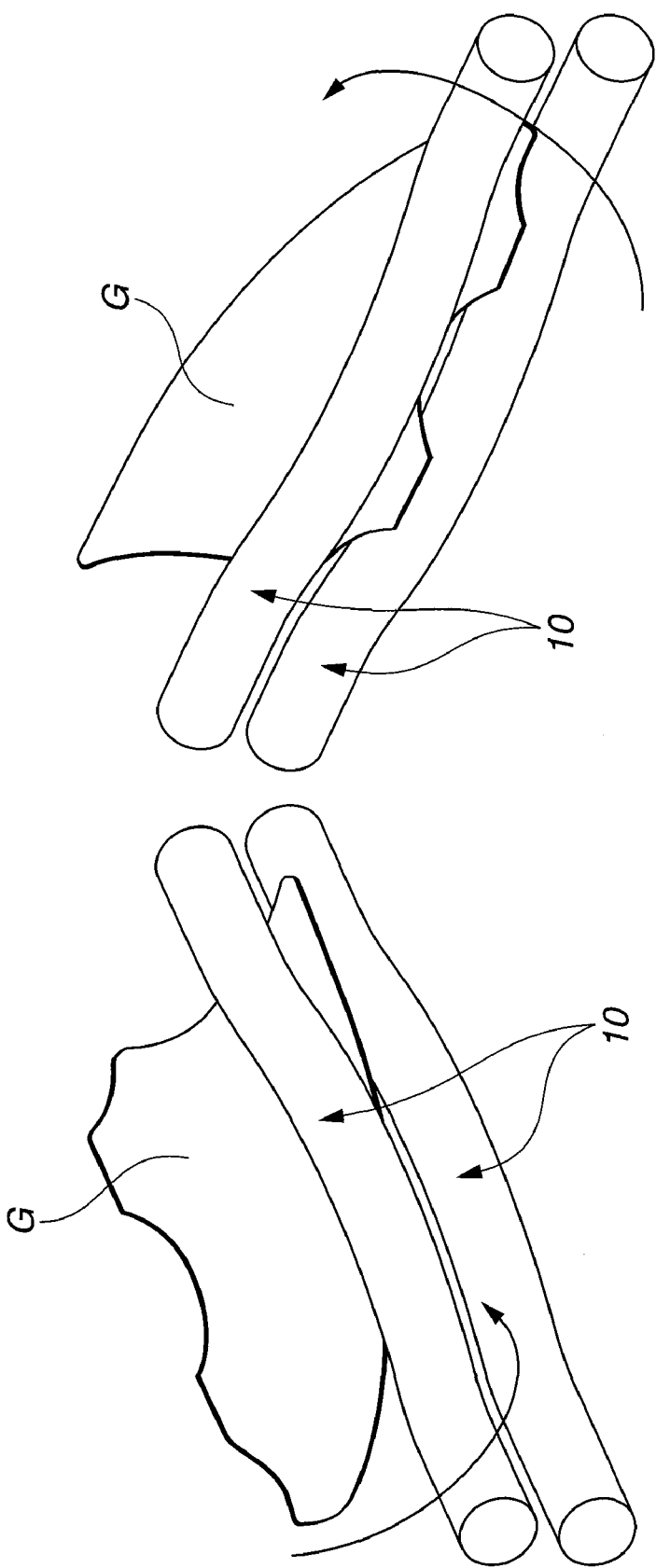
FIG. 6 is a drawing for explaining the embodiment 2.

An example 2 is a case where relatively small-sized curved glass plates having a shallow curvature, whose curved surface is expressed by $R_W$ and $R_H$ as shown in FIG. 5, such as a side window glass of the vehicle, among the curved shaped laminated glasses, are preliminarily bonded together.

Each of the curved convex surface portions of the fixed shafts 11, 11 is previously set to e.g. 30~45-degree angle which inclines in the lower direction as shown in the right hand side drawing in FIG. 4B by rotating each of the fixed shafts 11, 11 of the pair of arcuate curved rolls 10, 10 with the handle 33 or the motor through the decelerator 31. The gap between the curved rolls 10, 10, viewed from the horizontal direction of the incoming side of the glass plate G, becomes the gentle rounded arc shape as shown in the left hand side drawing in FIG. 4B.

Further, the carrying-in conveyor 71 and the carrying-out conveyor 72 of the carrying-in carrying-out means 70 are set to their respective inclined states which are fitted to the degree of the curvature of the glass plate, in order that the bottom surface of the glass plate is supported on the top surfaces of the carrying-in and carrying-out conveyors at the rear and front sides of the gap position and excessive force is not applied to the carried-in/out glass plates when the curved glass plates pass between the gap of the pair of curved rolls 10, 10.

With regard to the setting of the line connecting the axes of the pair of upper and lower side curved rolls 10, 10, it is the same as the embodiment 1.

EXAMPLE 3

An example 3 is a case where relatively large-sized curved glass plates having a deep curvature as shown in FIG. 7, such as front and rear window glasses of the vehicle, among the curved shaped laminated glasses, are preliminarily bonded together.

As same as the embodiment 2, by the curvature direction adjusting means 30, each of the curved convex surface portions of the fixed shafts 11, 11 of the pair of curved rolls 10, 10 is previously set to be inclined as shown in the right hand side drawings in FIGS. 4B and 4C. The gap between the curved rolls 10, 10, viewed from the horizontal direction of the incoming side of the glass plate G, becomes an arc shape having a desired curvature as shown in the left hand side drawings in FIGS. 4B and 4C.

Further, also regarding the inclination angles of the carrying-in conveyor 71 and the carrying-out conveyor 72 of the carrying-in carrying-out means 70, in the same manner as the embodiment 2, they are set to their respective inclined states which are fitted to the degree of the curvature of the glass plate.

By means of the turning means 40, the turning frames 41, 41 supporting the pair of curved rolls 10, 10 are turned by the motor with the gap portion being the rotation center, and as shown by a dashed line in FIG. 11, the top end side of the turning frame 41 tilts or inclines to the carrying-in conveyor 71 side, then the preliminary bonding device waits for the glass plate to be carried in so that the top end portion of the curved glass plate G comes to the gap position between the upper and lower curved rolls 10, 10.

Figure 8:
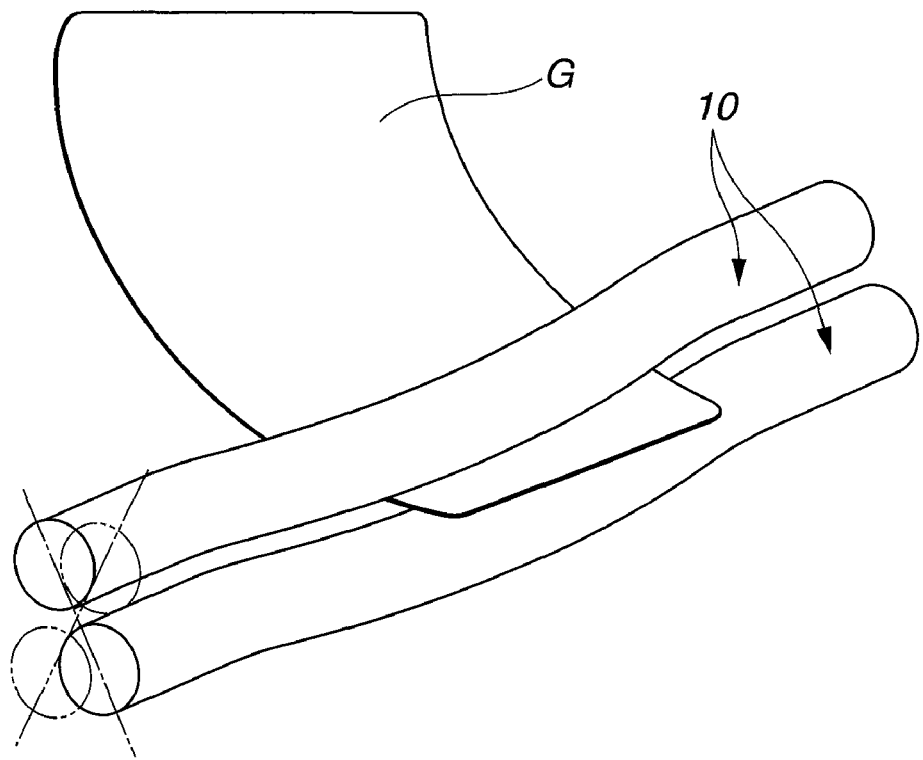
FIG. 8 is a drawing for explaining the embodiment 3.
Figure 9:
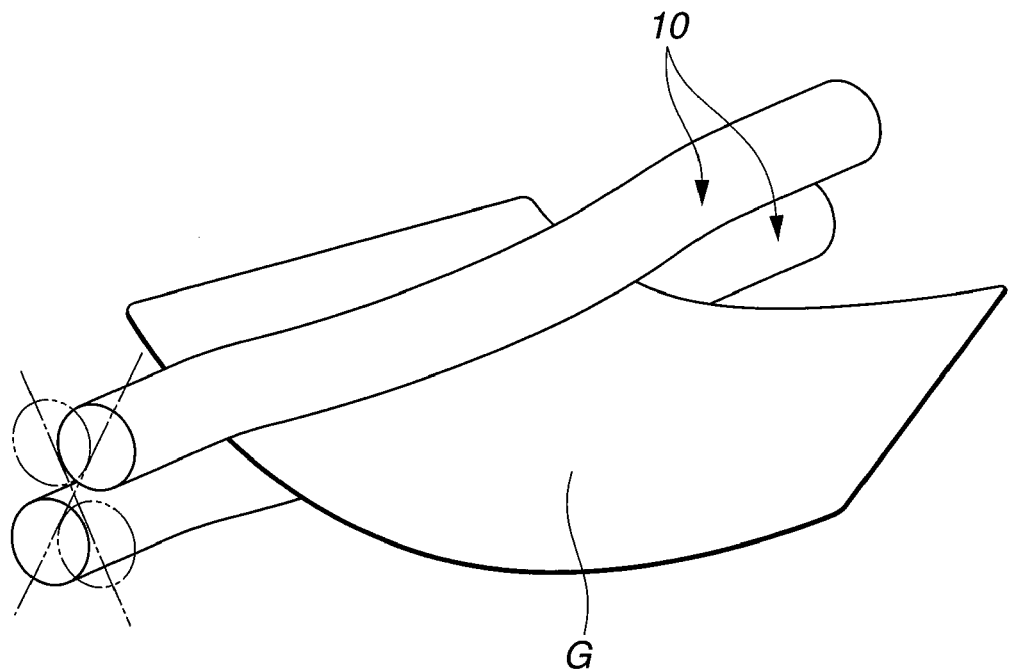
FIG. 9 is a drawing for explaining the embodiment 3.

After the curved glass plate comes on the carrying-in conveyor 71, as shown in FIG. 8, when the top end portion of the curved glass plate passes between the gap position of the pair of curved rolls 10, the turning frame 41 is gradually raised or stands up in accordance with the change of the curvature in a carrying direction of the curved glass plate. Further, as shown in FIG. 9, when the rear end portion of the curved glass plate passes between the gap position of the pair of curved rolls 10, the angle of the turning frame 41 is changed by the angle θ so that the top end side of the turning frame 41 tilts or inclines to the carrying-out conveyor 72 side, then the glass plate is carried out by the carrying-out conveyor 72.

That is to say, in the embodiment 3, by means of the turning means 40, the line connecting the center axes of the pair of curved rolls 10, 10 is set to the normal direction of the curved glass plate passing between the curved rolls 10, 10 at the gap position, then the pressing force is uniformly applied to the glass plates.

EXAMPLE 4

An example 4 is a case where glass plates of a flat shaped laminated glass as shown in FIG. 10 are preliminarily bonded together. Each of the curved convex surface portions of the fixed shafts 11, 11 is previously set to the angle of the horizontal direction as shown in the right hand side drawing in FIG. 4A by rotating each of the fixed shafts 11, 11 of the pair of arcuate curved rolls 10, 10 with the handle 33 or the motor through the decelerator 31. The gap between the curved rolls 10, 10, viewed from the horizontal direction, becomes linear. In addition, the line connecting the axes of the pair of upper and lower side curved rolls 10, 10 is set to the vertical direction. The turning means is not used.

Furthermore, the carrying-in conveyor 71 and the carrying-out conveyor 72 of the carrying-in carrying-out means 70 are set to a horizontal state so that each position of carrying surfaces of the conveyors is set to the gap position of the pair of curved rolls 10, 10.

Although the gap between the pair of curved rolls 10, 10 is set to be narrower than the total thickness of the two glass plates sandwiching therebetween the interlayer, at the narrowest, the gap is set to about the thickness of the two glass plates. The glass plates are then pressed together from both surfaces with the uniform pressure by the curved rolls.

EXPLANATION OF REFERENCE SIGN

G curved glass plate
1 preliminary bonding device
2 base stage
10 curved roll
11 fixed shaft
15 covering roll member
20 roll driving means
21 driving motor
22 driving chain
23 gear
30 curvature direction adjusting means
31 decelerator
32 motor
33 handle
40 turning means
41 turning frame
42 turning motor
43 turning axis
50 roll gap adjusting means
51 bearing 52 gear
53 connecting rod
54 handle
55 guide
60 roll pressing means
61 press cylinder
63 press plate
70 carrying-in carrying-out means
71 carrying-in conveyor
72 carrying-out conveyor

The invention claimed is:

1. A preliminary bonding device for laminated glass, which bonds superposed glass plates together through an interlayer that is sandwiched between the glass plates by sandwiching and pressing the glass plates from both outside surfaces of the superposed glass plates, the preliminary bonding device comprising:
- a pair of upper and lower arcuately-curved rigid fixed shafts, each of which has an arc shape at a middle portion thereof and a linear shape at both ends thereof;
- a pair of curved rolls (10, 10), each of which is formed from a covering roll member (15) of a flexible resin layer that covers whole outermost circumferential surfaces of a plurality of short rigid cylindrical members (14) that are provided at an outer circumference of the fixed shaft (11) and are able to rotate through bearings (12);
- a roll driving means (20) which drives and rotates the covering roll member (15) of the curved roll (10);
- a curved portion inclination angle adjusting means (30) which changes a curved rounded shape of a gap portion between the pair of upper and lower curved rolls (10, 10), viewed from an incoming direction of the glass plates between the curved rolls (10, 10), by simultaneously rotating the fixed shafts (11, 11) of the pair of upper and lower curved rolls (10, 10) and adjusting an inclination angle of the curved middle portion of the fixed shaft (11); and
- a roll pressing means (60) which sandwiches and presses the glass plates between the curved rolls (10, 10).

2. The preliminary bonding device of the laminated glass, as claimed in claim 1, further comprising:
- a roll gap adjusting means (50) which adjusts the gap between the pair of upper and lower curved rolls (10, 10) in accordance with a thickness of the glass plates by moving both ends of the upper curved roll (10) together in an upper or a lower direction.

3. The preliminary bonding device of the laminated glass, as claimed in claim 1, further comprising:
- a turning means (40) which turns a supporting frame (41) that supports both end portions of the pair of upper and lower fixed shafts (11, 11) so that when passing the curved superposed glass plates between the pair of upper and lower curved rolls (10, 10), an imaginary line connecting rotation centers of the pair of upper and lower curved rolls (10, 10) is a normal of a surface of the superposed glass plates sandwiched by the curved rolls (10, 10) at a fulcrum point of the surface of the glass plates with a midpoint of the imaginary line being the fulcrum.

* * * * *